United States Patent [19]
Maute et al.

[11] 4,074,124
[45] Feb. 14, 1978

[54] ILLUMINATION APPARATUS FOR SIMULATING NIGHT, DAWN AND MORNING, MID-DAY AND AFTERNOON AND DUSK NATURAL LIGHT CONDITIONS

[76] Inventors: Charles J. Maute, 66 Ball Road, Mountain Lakes, N.J. 07046; Anthony V. Ianetti, 4 Trojan Ave., Parsippany, N.J. 07054

[21] Appl. No.: 725,441

[22] Filed: Sept. 22, 1976

[51] Int. Cl.² .............................................. F21V 11/18
[52] U.S. Cl. .................................... 362/217; 362/280
[58] Field of Search ............... 240/46.19, 46.21, 46.01, 240/46.05, 51.11 R, 10.1

[56] References Cited
U.S. PATENT DOCUMENTS

| | | | |
|---|---|---|---|
| 2,308,986 | 1/1943 | Livers | 240/51.11 R |
| 2,374,640 | 4/1945 | Paul | 240/10.1 |
| 2,493,829 | 1/1950 | Paul | 240/10.1 |
| 2,567,403 | 9/1951 | Rockola | 240/10.1 |

*Primary Examiner*—Richard L. Moses
*Attorney, Agent, or Firm*—Carella, Bain, Gilfillan & Rhodes

[57] ABSTRACT

Illumination apparatus including a source of artificial light and shutters for totally concealing the source of light during a first amount of time to simulate night conditions, for gradually exposing increasingly larger portions of the source of artificial light during a second amount of time to simulate dawn and morning conditions, for constantly exposing a portion of the source of artificial light during a third amount of time to simulate mid-day condition, and for gradually concealing an increasingly larger portion of the source of artificial light during a fourth amount of time to simulate afternoon and dusk conditions.

3 Claims, 5 Drawing Figures

NIGHT

DAWN AND MORNING

MID-DAY

AFTERNOON AND DUSK

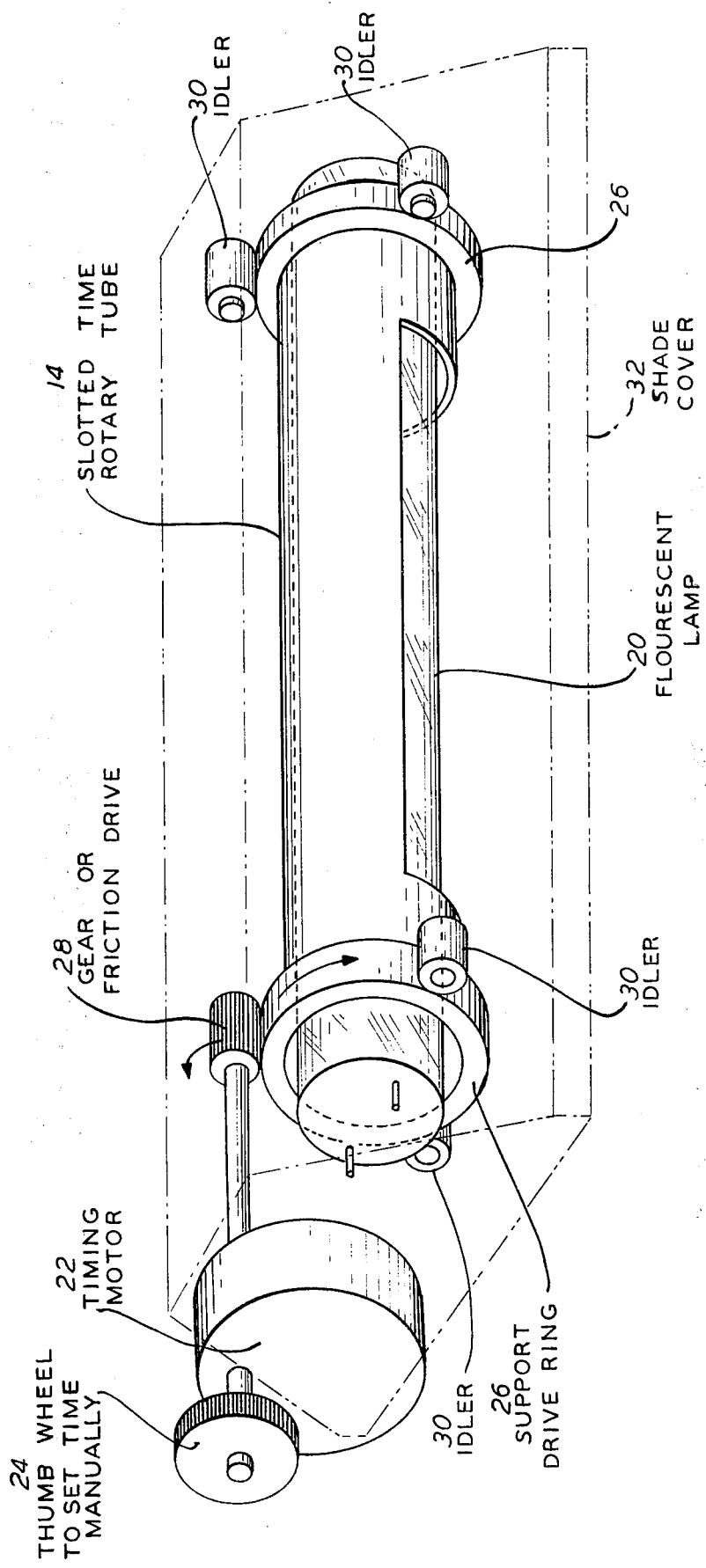

ILLUMINATION APPARATUS FOR SIMULATING NIGHT, DAWN AND MORNING, MID-DAY AND AFTERNOON AND DUSK NATURAL LIGHT CONDITIONS

BACKGROUND OF THE INVENTION

The present invention relates to illumination apparatus in general, and in particular, relates to illumination apparatus for simulating night, dawn and morning, midday, and afternoon and dusk natural light conditions.

As is known to those skilled in the illumination art, many different varied illumination apparatus are known for providing many different types of illumination. For example, light emitting alarm clocks are known which provide instantaneously, at a predetermined time, a brilliant emission of light to wake up a sleeping person. Also known to the prior art are illumination apparatus for providing an artificial sunrise which provides an increasingly brighter amount of illumination until a steady state of illumination is reached. To the contrary, illumination apparatus which provide illumination at a constant state which decreases gradually to states of increasing darkness until total darkness is reached are known and are typically provided to assist small children in going to sleep.

However, as is further known to those skilled in the illumination art and to those knowledgable about plants such as flowers and fish kept in fish tanks inside of, for example a house, such plants and fish appear to thrive and survive better when constantly subjected to or exposed to illumination in accordance with the night, dawn and morning, mid-day, and afternoon and dusk natural light conditions or illumination cycle.

Accordingly, there exists a need in the art for illumination apparatus utilizing artificial light which simulates such night, dawn and morning, mid-day, and afternoon and dusk natural light conditions — such apparatus being particularly useful in offices, apartments, and rooms in the home not having an exposure to the natural light conditions.

SUMMARY OF THE INVENTION

Accordingly, a primary object of the present invention is to provide new and useful illumination apparatus.

A more specific object of the present invention is to provide illumination apparatus for simulating night, dawn and morning, mid-day, and afternoon and dusk natural light conditions utilizing artificial light.

Illumination apparatus satisfying the foregoing objects and embodying the present invention may include a source of artificial light and shutters operatively associated with the light for totally concealing the light during a first predetermined amount of time to simulate night conditions, for gradually exposing increasingly larger portions of the light during a second predetermined amount of time to simulate dawn and morning conditions, for constantly exposing a portion of the light during a third predetermined amount of time to simulate mid-day conditions and for gradually concealing an increasingly larger portion of the artificial light during a fourth predetermined amount of time to simulate afternoon and dusk conditions.

DESCRIPTION OF THE DRAWINGS

FIG. 5 is a schematic illustration showing apparatus embodying the present invention.

DESCRIPTION OF THE INVENTION

Referring now to FIGS. 1, 2, 3 and 4, illumination apparatus according to the present invention, and in particular illumination apparatus for simulating night, dawn and morning, mid-day, and afternoon and dusk natural light conditions are shown.

Such apparatus may include a source of artificial light 10, such as for example a fluorescent light tube and first and second opaque shutters 12 and 14 operatively associated with the source of artificial light, such as for example as taught below with regard to FIG. 5.

Figure 1:
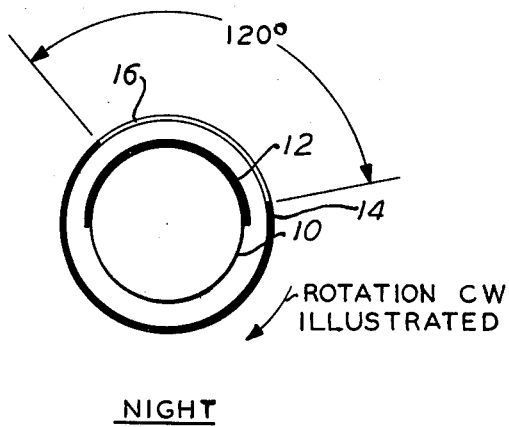
FIGS. 1, 2, 3 and 4 are diagrammatic cross-sectional views of apparatus embodying the present invention.
Figure 2:
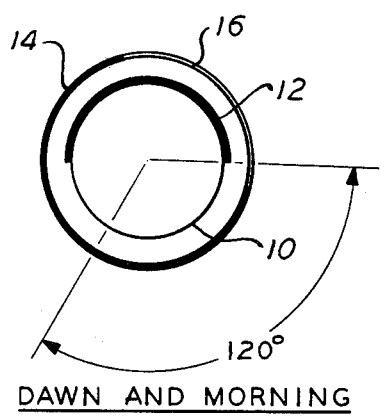
Figure 3:
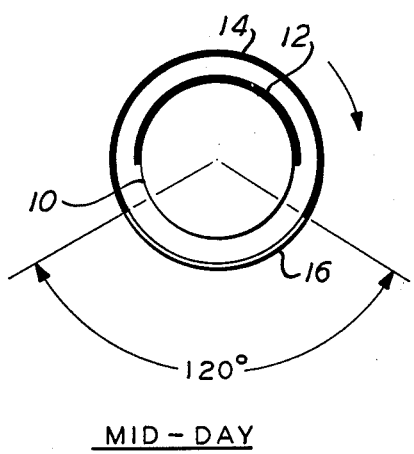
Figure 4:
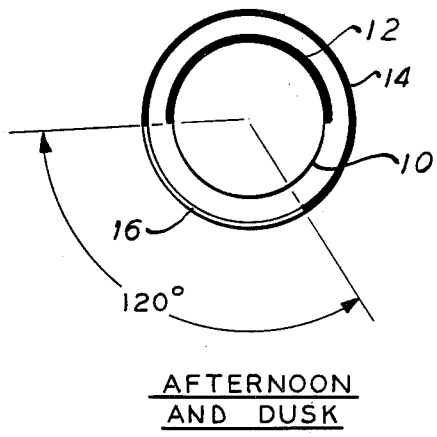

Opaque shutter 14 has a light or illumination admitting slot 16 formed therein, and upon relative rotational movement being provided between the shutters, the shutters will cooperatively (i) totally conceal the source of artificial light during a first amount of time to simulate night conditions as illustrated in FIG. 1,
(ii) gradually exposing increasingly larger portions of the source of artificial light during a second amount of time to simulate dawn and morning conditions as illustrated in FIG. 2,
(iii) constantly expose a portion of the source of artificial light during a third amount of time to simulate mid-day condition as shown in FIG. 3, and
(iv) gradually conceal an increasingly larger portion of the source of artificial light during a fourth amount of time to simulate afternoon and dusk conditions as shown in FIG. 4.

Referring still to FIGS. 1-4, it will be further understood in accordance with the teachings of the present invention that the source of artificial light 10 may be a fluorescent light tube extending longitudinally a predetermined length and being of a right circular cylindrical configuration and for emitting light radially outwardly along its length and for 360° around its outer circular surface. The first opaque shutter 12 may extend longitudinally substantially coequally in length with the fluorescent light tube and may be of a hollow, semi-circular right cylindrical configuration which may be mounted fixedly proximal to the outer circular surface of the fluorescent light tube and for constantly concealing 180° of the circular outer surface of the fluorescent light tube. More specifically, the first shutter 12 may be so configured and may be provided of suitable opaque material suitably adhesed to the outer surface of the fluorescent light tube or, by way of further example, may be comprised of a layer or coating of opaque material such as black paint applied to the source of artificial light 10.

The second opaque shutter 14 may be of hollow, right circular cylindrical configuration extending longitudinally substantially coequally in length to the fluorescent light tube and the first opaque shutter 12. The second opaque 14 may be truncated on or along a plane parallel to and outwardly of its longitudinal axis and a predetermined distance therefrom so as to provide the slot 16 extending longitudinally thereof and substantially coequal in length thereto. In the embodiment illustrated in FIGS. 1-5, the slot 16 extends both substantially coequal in length to the opaque cylinders 12 and 14 and the fluorescent tube 10 and extends substantially 120° around the outer circular surface of the opaque shutter 14. The second opaque shutter 14 surrounds the first opaque shutter 12 and the flourescent tube 10 having its longitudinal axis coincidental with the longitudinal axis of the fluorescent light tube and the second shutter 14 may be suitably mounted for rotation through 360°.

Accordingly, upon the flourescent light tube 10 being energized and upon the second opaque shutter 14 being rotated, for example, through 360° during a 24 hour period, the opaque shutters 12 and 14 will cooperatively (i) totally conceal the fluorescent light tube for substantially a 12 hour period of time to simulate the night condition, (ii) generally expose increasingly larger portions of the circular surface of the fluorescent light tube not covered by the fixedly mounted first opaque shutter 12 during approximately 4 hours of time to simulate the dawn and morning conditions as illustrated in FIG. 2, (iii) constantly expose substantially 120° of the outer circular surface of the fluorescent light tube not covered by the first opaque shutter 12 during substantially 4 hours of time to simulate the mid-day condition as illustrated in FIG. 3, and (iv) gradually totally concealing substantially 120° of the circular outer surface of the fluorescent light tube 10 not covered by the first opaque shutter during substantially 4 hours of time to simulate the afternoon and dusk conditions.

More specifically, and referring to the dawn and morning condition illustrated in FIG. 2, as the opaque cylinder 14 rotates further clockwise the slot 16 will rotate past the fixedly mounted opaque shutter 12 to expose increasingly larger portions of the outer surface of the artificial light source 10 thereby first simulating a dawn condition and then as an increasingly larger portion of the surface of the light 10 is exposed the morning condition will be simulated.

Referring more specifically to FIG. 3, upon the slot 16 being rotated past the first shutter 12, the slot 16 will constantly expose substantially 120° of the outer surface of the fluorescent light tube 10 as the opaque cylinder 14 is rotated clockwise as shown in FIG. 3 and until the slot 16 first rotates past the fixedly mounted opaque shutter 12.

As illustrated in FIG. 4, upon continued clockwise rotation of the opaque shutter 14 after the slot 16 first rotates past the fixedly mounted shutter 12, the opaque shutter 14 will gradually totally conceal substantially 120° of the outer circular surface of the fluorescent tube not covered by the first opaque shutter 12 during the substantially 4 hours of time required to cause the shutter 14 to again totally conceal the uncovered portion of the fluorescent light tube whereby the illumination admitted through the slot 16 will gradually decrease to total darkness whereby the afternoon and dusk conditions will be simulated.

Referring now to FIG. 5, it will be understood by those skilled in the illumination apparatus art, that the source of artificial light may be the above described fluorescent tube 20 and the fixedly mounted first opaque shutter 12 may be structured as set forth above. Further, the means for rotating the second opaque shutter 14 having the slot 16 formed therein may be a suitable timing motor 22 which may be any one of several known to the art and which may be provided with a thumb wheel 24 for setting the time manually. The rotatably mounted second opaque shutter 14 may be provided with suitable drive rings 26 suitably secured to the outer surface thereof and for being rotatably engaged by a suitable gear or friction drive member 28 for rotating the shutter 14 through 360° during a 24 hour period of time. Further, suitable idlers 30 may be provided in the manner known to those skilled in the art for positioning the shutter 14 and maintaining it is coaxial alignment with the flourescent tube 20. If desired, the illumination apparatus of the present invention may further include a shade or cover 32 for further confining the illumination emitted from the present invention as may be desired.

It will be still further understood by those skilled in the art that while the present invention has been taught above with regard to clockwise rotational movement of the second opaque shutter 14, the same result could be achieved by rotating the second opaque shutter 14 in the counterclockwise direction. Further, while the present invention has been taught in regard to a 24 hour cycle of time, other cyclic periods of time may be provided merely by changing the amount of time it takes the timing motor 22 to rotate the second opaque shutter 14 through 360° of rotation.

Many modifications and variations may be made in the present invention without departing from the spirit and the scope thereof, for example, the apparatus of the present invention may be operated cyclically and/or continually and with or without a manual or automatically "ON and OFF" device.

What is claimed is:

1. Illumination apparatus for simultating night, dawn and morning, mid-day and afternoon and dusk natural light conditions, comprising:
   means for providing a source of artificial light; and
   shutter means including a pair of shutters operatively associated with said source of artificial light for totally concealing said source of artificial light during a first predetermined amount of time to simulate said night condition, for gradually exposing increasingly larger portions of said source of artifical light during a second predetermined amount of time to simulate said dawn and morning conditions, for constantly exposing a predetermined portion of said source of artificial light during a third predetermined amount of time to simulate said mid-day condition, and for gradually concealing increasingly larger portions of said source of artificial light during a fourth predetermined amount of time to simulate said afternoon and dusk conditions, and
   one of said shutters mounted fixedly and the other of said shutters mounted rotatably through 360°.

2. Illumination apparatus for simulating night, dawn and morning, mid-day and afternoon and dusk natural light conditions, comprising:
   a flourescent light tube for providing artificial light upon being energized;
   a first opaque shutter of a semi-circular hollow right cylindrical configuration mounted fixedly proximal to said electric light source and for constantly concealing a predetermined portion of said electric light source;
   a second opaque shutter of a hollow right circular cylindrical configuration truncated on a predetermined plane parallel to and outwardly of the longitudinal axis thereof, said second shutter mounted proximal to said light source and mounted for rotation through 360°; and
   upon said second opaque shutter experiencing said predetermined movement, said first and second shutters cooperating to:

(i) totally conceal said electric light source for a first predetermined amount of time to simulate said night condition, (ii) gradually expose increasingly larger portions of said electric light source during a second predetermined amount of time to simulate said dawn and morning conditions, (iii) constantly expose a predetermined portion of said electric light source during a third predetermined amount of time to simulate said mid-day condition, and (iv) gradually conceal increasingly larger portions of said electric light source during a fourth predetermined amount of time to simulate said afternoon and dusk conditions.

3. Illumination apparatus for simulating night, dawn and morning, mid-day, and afternoon and dusk natural light conditions, comprising:

a fluorescent light tube extending longitudinally a predetermined length and of a right circular cylindrical configuration and for emitting light radially outwardly along the length and for 360° around it outer circular surface upon being energized;

a first opaque shutter extending longitudinally substantially coequally in length with said fluorescent light tube and of a hollow, semi-circular right cylindrical configuration, said first opaque shutter being mounted fixedly proximal to the circular outer surface of said fluorescent light tube and for substantially concealing 180° of the circular surface of said light tube along the entire length thereof;

a second opaque shutter extending longitudinally substantially coequally in length to said fluorescent light tube and of a hollow, right circular cylindrical configuration and being truncated on a plane parallel to and outwardly of its longitudinal axis such that a longitudinally extending slot is formed therein along its entire length and providing a slot extending through substantially 120° around the outer circular surface thereof;

said second shutter surrounding said fluorescent light tube and said first shutter with its longitudinal axis coincidental with the longitudinal axis of said flourescent light tube and being mounted for rotation through 360°;

means operatively associated with said second opaque shutter for rotating said second opaque shutter through said 360° during a 24 hour period; and upon said fluorescent light tube being energized and upon said second opaque shutter being rotated, said first and second shutters cooperatively:

(i) totally concealing said fluorescent light tube for a 12 hour period of time to simulate said night condition, (ii) gradually exposing increasingly larger portions of the circular surface of said flourescent light tube not covered by said first opaque shutter during approximately 4 hours of time to simulate said dawn and morning conditions, (iii) constantly exposing substantially 120° of the outer circular surface of said flourescent light tube not covered by said first opaque shutter during substantially 4 hours of time to simulate said mid-day condition, and (iv) gradually totally concealing substantially 120° of the circular surface of said flourescent light tube not covered by said first opaque shutter during substantially 4 hours of time to simulate said afternoon and dusk conditions.

* * * * *